United States Patent
Kang et al.

(10) Patent No.: US 10,257,700 B2
(45) Date of Patent: Apr. 9, 2019

(54) APPARATUS AND METHOD FOR CONTROLLING VEHICLE USING USER TERMINAL

(71) Applicant: HYUNDAI MOBIS CO., LTD., Seoul (KR)

(72) Inventors: Jong Joo Kang, Yongin-si (KR); Joung Ho Han, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 148 days.

(21) Appl. No.: 15/236,207

(22) Filed: Aug. 12, 2016

(65) Prior Publication Data
US 2017/0105120 A1  Apr. 13, 2017

(30) Foreign Application Priority Data
Oct. 7, 2015  (KR) .................. 10-2015-0140865

(51) Int. Cl.
*H04L 29/06* (2006.01)
*H04W 12/06* (2009.01)
*H04W 12/04* (2009.01)
*H04W 4/80* (2018.01)

(52) U.S. Cl.
CPC ......... *H04W 12/06* (2013.01); *H04L 63/0492* (2013.01); *H04L 63/064* (2013.01); *H04L 63/08* (2013.01); *H04L 63/0876* (2013.01); *H04W 4/80* (2018.02); *H04W 12/04* (2013.01)

(58) Field of Classification Search
CPC ....... H04W 4/80; H04W 12/04; H04W 12/06; H04L 63/0492; H04L 63/064; H04L 63/08; H04L 63/0876
See application file for complete search history.

(56) References Cited

U.S. PATENT DOCUMENTS

| 6,058,476 A * | 5/2000 | Matsuzaki ............ H04L 9/3273 380/278 |
| 2007/0200671 A1* | 8/2007 | Kelley .................. B60R 25/257 340/5.72 |

(Continued)

FOREIGN PATENT DOCUMENTS

| CN | 101393658 A | 3/2009 |
| CN | 103309315 A | 9/2013 |
| KR | 10-1232640 B1 | 2/2013 |

OTHER PUBLICATIONS

Rolling code—Wikipedia NPL.*
(Continued)

*Primary Examiner* — Tri M Tran
(74) *Attorney, Agent, or Firm* — Knobbe Martens Olson & Bear LLP

(57) ABSTRACT

Disclosed are an apparatus and a method for controlling a vehicle using a user terminal that authenticates a user terminal using an NFC module mounted in a vehicle and controls the vehicle using communication between the NFC module and the user terminal. An apparatus for controlling a vehicle using a user terminal includes: a terminal authenticator that authenticates a user terminal using any one module of wireless communication modules mounted in a vehicle; and a vehicle controller that controls the vehicle in a fit-type in accordance with the position of the any one module when the user terminal is authenticated.

4 Claims, 9 Drawing Sheets

(56) References Cited

U.S. PATENT DOCUMENTS

| | | | | |
|---|---|---|---|---|
| 2010/0085160 | A1* | 4/2010 | Fu | A61N 1/37223 340/10.1 |
| 2010/0286846 | A1* | 11/2010 | Liang | B60R 25/24 701/2 |
| 2013/0331027 | A1* | 12/2013 | Rose | H04W 12/06 455/41.1 |
| 2014/0172197 | A1* | 6/2014 | Ganz | G08C 17/02 701/2 |
| 2016/0080890 | A1* | 3/2016 | Shao | H04W 4/70 701/36 |

OTHER PUBLICATIONS

Diana Melexis—PKE and NFC to unlock the automotive market—NPL 2012; obtained from https://www.electronicdesign.com/communications/use-pke-and-nfc-unlock-automotive-market; Date:Aug. 8, 2018 (Year: 2012).*

Telecom Italia—Near Field Communication—What a smartphone can do with a car; youtube link: https://www.youtube.com/watch?v=gj52cxADj1E; Obtained Date: Aug. 7, 2018 (Year: 2013).*

Office Action of corresponding Chinese Patent Application No. 201610872888.7—5 pages (dated Aug. 2, 2018).

* cited by examiner

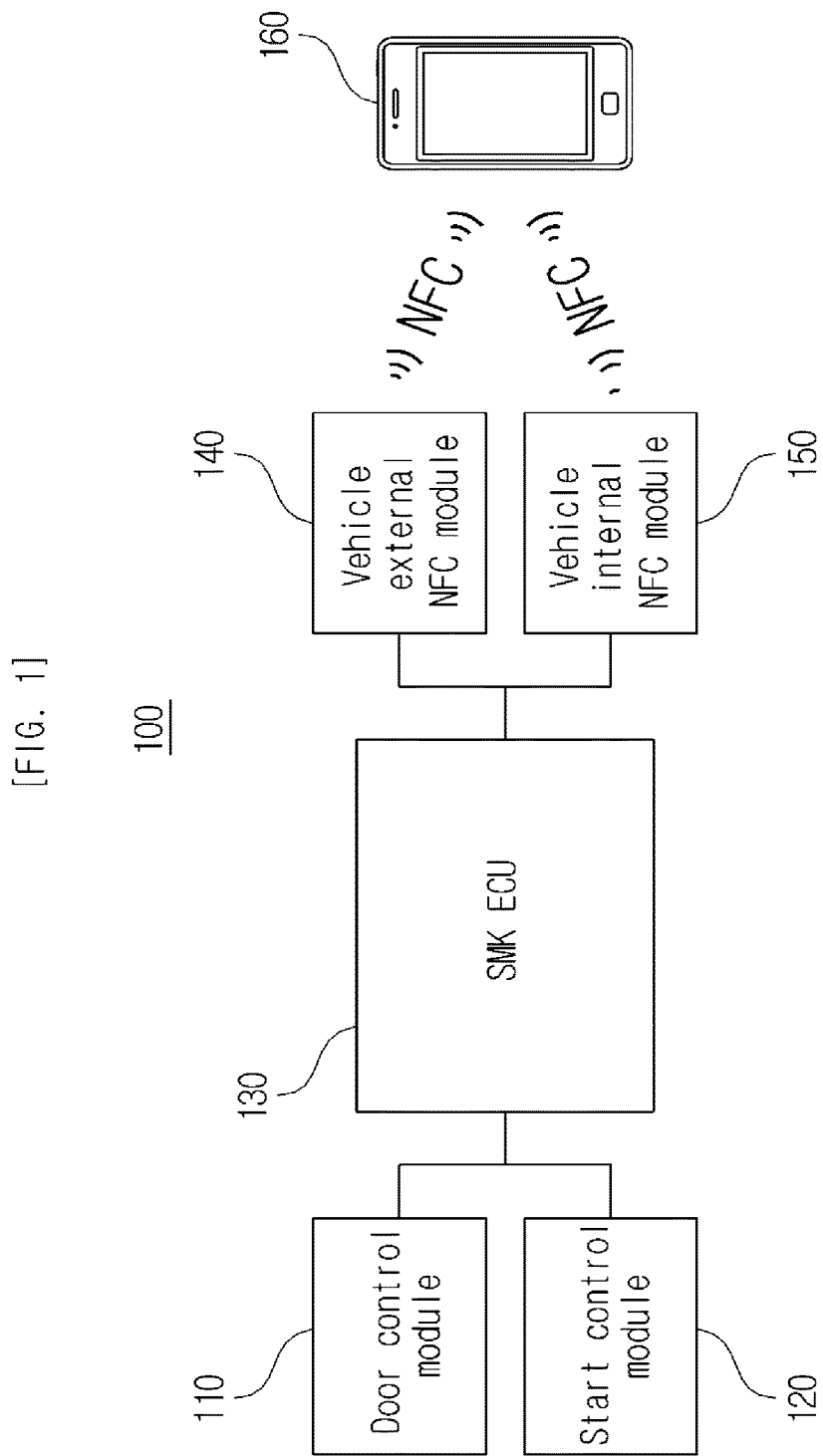
[FIG. 1]

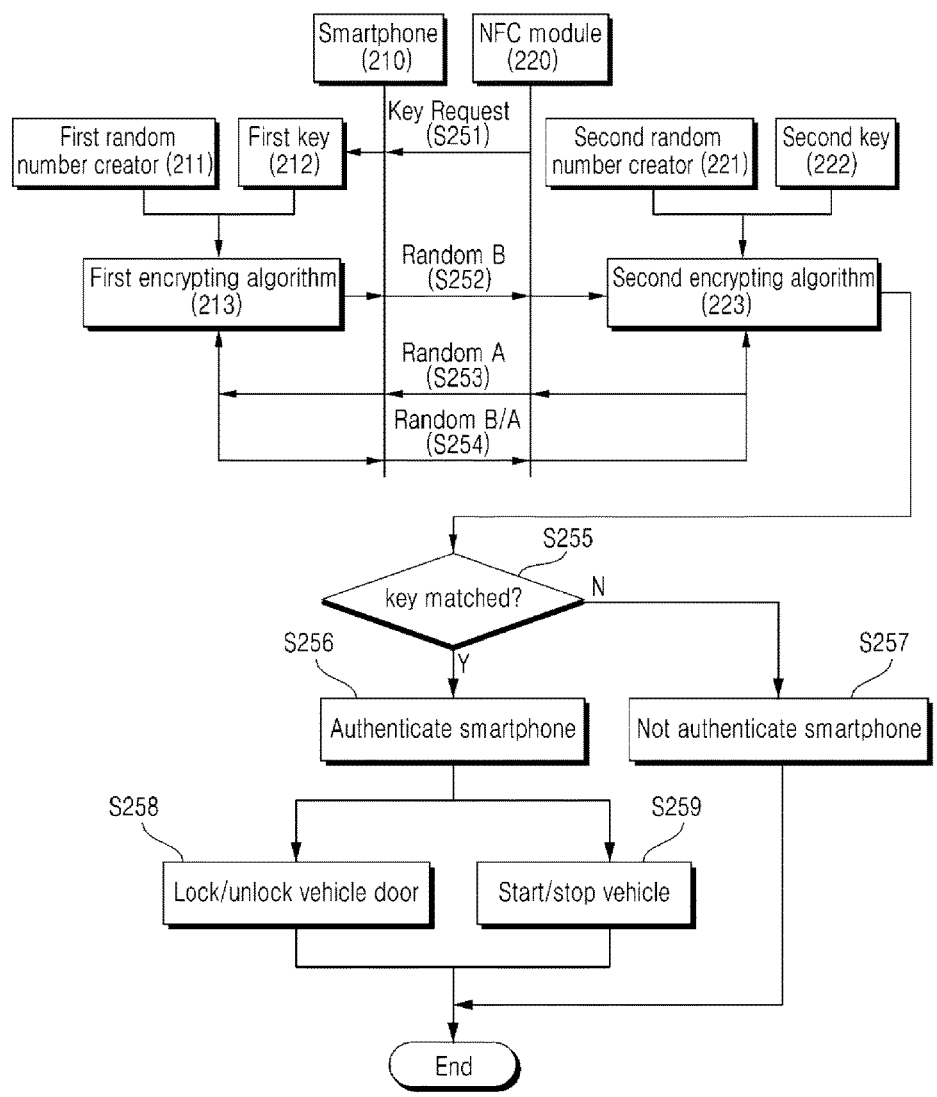
[FIG. 2]

[FIG. 3]
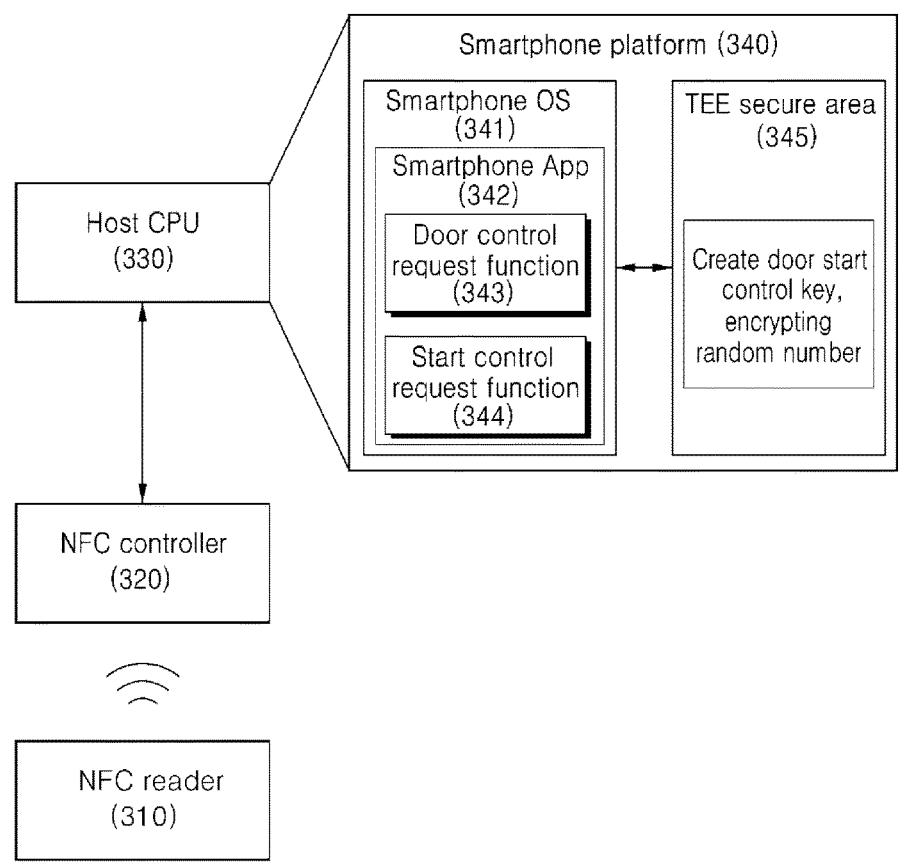

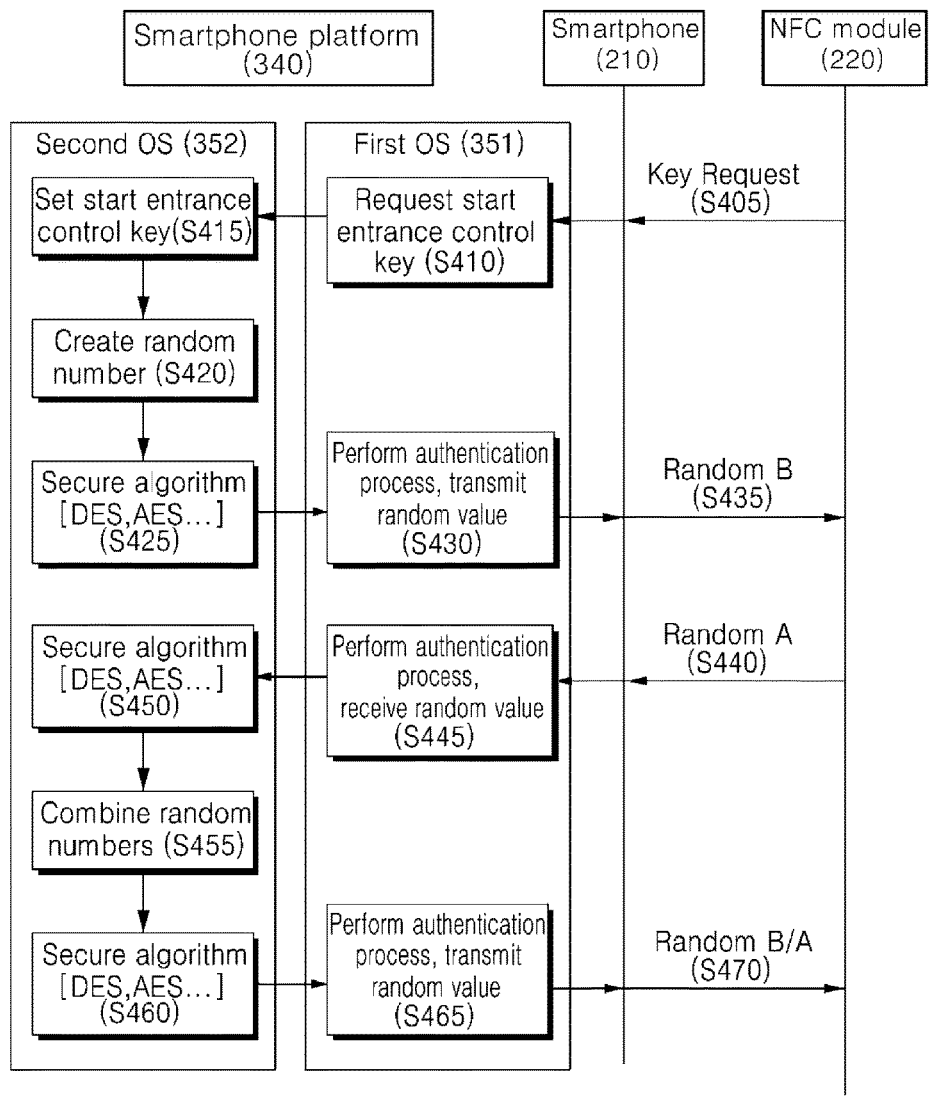
[FIG. 4]

[FIG. 5]

```
AES_KEY key;
int init_ctr( struct ctr_state *state, const unsigned char iv[8]){
    state->num = 0;
    memset(state->ecount, 0, AES_BLOCK_SIZE);
    memset(state->ivec+8, 0, 8);
    memcpy(state->ivec, iv, 8);
}
// encrypt twice == decrypt void encrypt(unsigned char *indata,unsigned char *outdata ,int bytes_read){
    int i=0;
    int mod_len=0;
    AES_set_encrypt_key(ckey, KEY_SIZE, &key);                    ~510
    if(bytes_read < BYTES_SIZE)}
        struct ctr_state state;
        init_ctr(&state, iv);
        AES_ctr128_encrypt(indata, outdata, bytes_read, &key, state.ivec, stats.ecount, &state.num);
        return;
    }
    // loop block size = [ BYTES_SIZE ]
    for(i=BYTES_SIZE; i <= bytes_read ; i+=BYTES_SIZE){
        struct ctr_state state;
        init_ctr(&state, iv);
        AES_ctr128_encrypt(indata, outdata, BYTES_SIZE, &key, state.ivec, stats.ecount, &state.num);
        indata+=BYTES_SIZE;
        outdata+=BYTES_SIZE;
    }
    mod_len = bytes_read % BYTES_SIZE;
    if(mod_len != 0){                                              520
        struct ctr_state state;
        init_ctr(&state, iv);
        AES_ctr128_encrypt(indata, outdata, mod_len, &key, state.ivec, stats.ecount, &state.num);
    }
}
```

[FIG. 6]
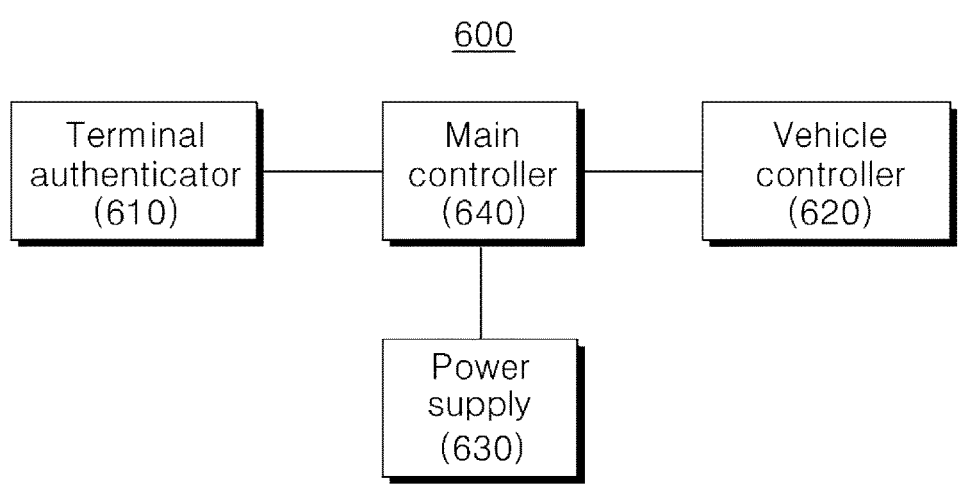

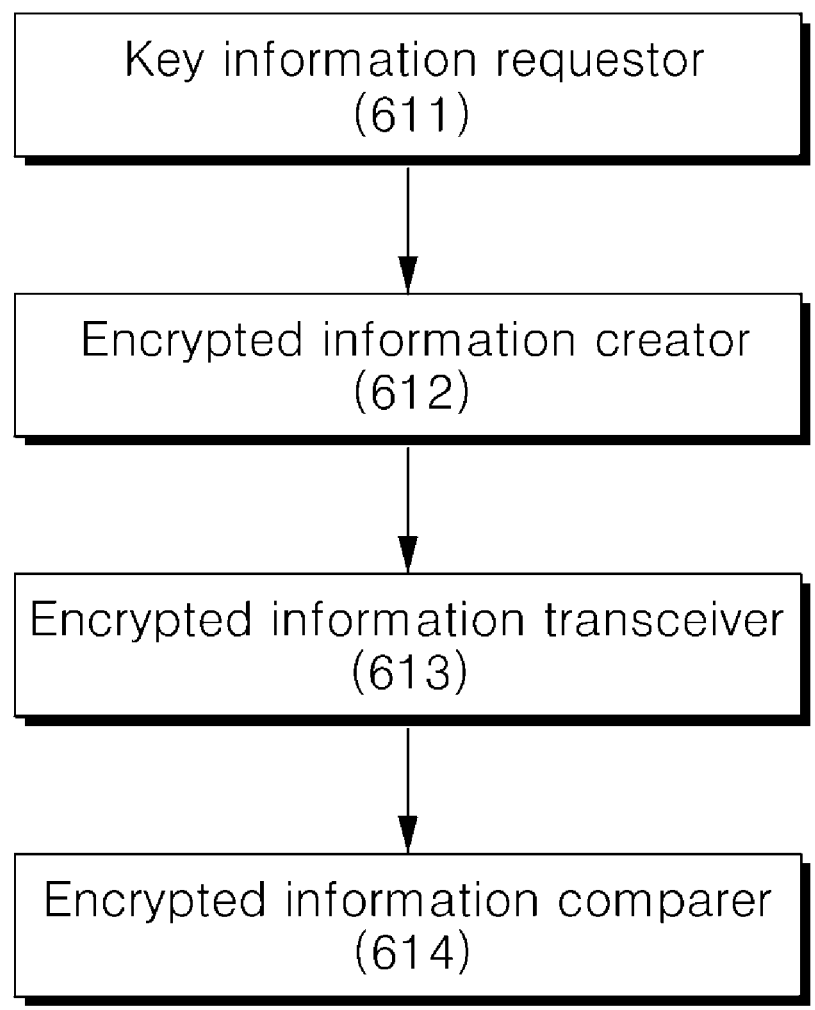
[FIG. 7]

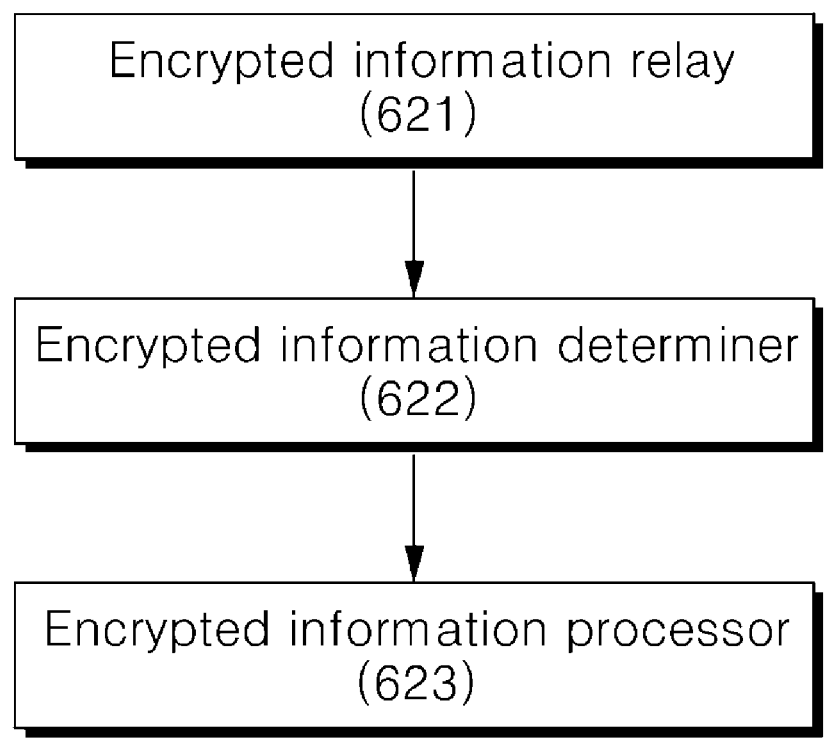

[FIG. 9]
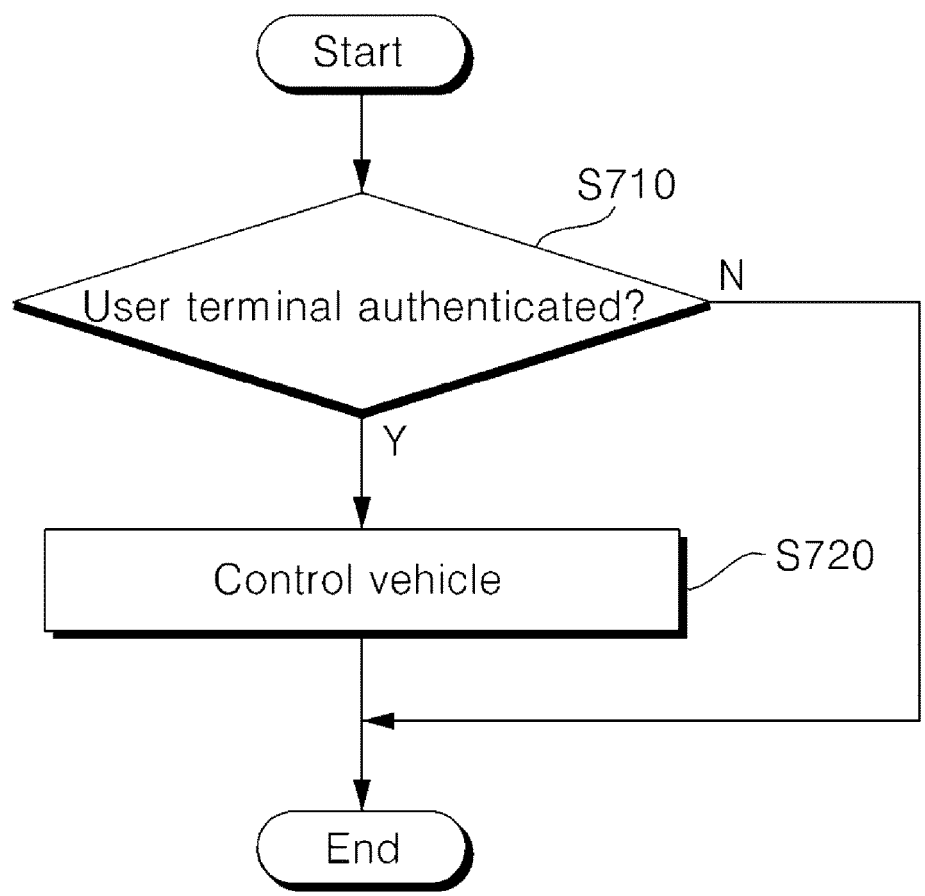

APPARATUS AND METHOD FOR CONTROLLING VEHICLE USING USER TERMINAL

CROSS-REFERENCE TO RELATED APPLICATIONS

This application claims priority to and the benefit of Korean Patent Application No. 10-2015-0140865 filed in the Korean Intellectual Property Office on Oct. 7, 2015, the entire contents of which are incorporated herein by reference.

TECHNICAL FIELD

The present disclosure relates to an apparatus and a method for controlling a vehicle. More particularly, the present disclosure relates to an apparatus and a method for controlling a vehicle using a user terminal.

RELATED TECHNOLOGY

Recently, as smartphones have been popularized, various services using them have been developed. In particular, services such as financial payment, access control, simple inter-phone data exchange, vehicle control for car sharing using near field communication have been further developed.

A security technology is very important for using smartphones and near field communication, but there are various difficulties in applying a security technology to a vehicle system.

The related technology is disclosed in Korean Patent No. 1,232,640.

SUMMARY

One aspect of the present invention provides an apparatus and a method for controlling a vehicle using a user terminal that authenticates a user terminal using an NFC (Near Field Communication) module in a vehicle and controls the vehicle using communication between the NFC module and the user terminal.

However, the aspects of the present invention are not limited to those stated above and other aspects not stated above may be clear to those skilled in the art from the following description.

An embodiment of the present invention provides an apparatus for controlling a vehicle using a user terminal that includes: a terminal authenticator that authenticates a user terminal using any one module of wireless communication modules mounted in a vehicle; and a vehicle controller that controls the vehicle in a fit-type in accordance with the position of the any one module when the user terminal is authenticated.

In embodiments, the terminal authenticator uses a module selected from an NFC (Near Field Communication) module, a Bluetooth module, a WiFi module, an RFID module, and a Beacon module, as the any one module.

In embodiments, the terminal authenticator uses a first communication module mounted outside the vehicle and a second communication module mounted inside the vehicle as the wireless communication modules.

In embodiments, the vehicle controller locks or unlocks doors of the vehicle when the first communication module is used as the any one module, and starts or stops the vehicle when the second communication module is used as the any one module.

In embodiments, the terminal authenticator includes: a key information requestor that requests second key information to the user terminal using first key information stored in advance; an encrypted information creator that creates first encrypted information on the basis of the first key information; an encrypted information transceiver that transmits the first encrypted information to the user terminal and receives integrated encrypted information including the first encrypted information and the second encrypted information from the user terminal; and an encrypted information comparer that authenticates the user terminal by comparing the first encrypted information and the second encrypted information.

In embodiments, the second encrypted information is created on the basis of the second key information.

In embodiments, the vehicle controller includes: an encrypted information relay that transmits the third encrypted information to a predetermined host unit when the third encrypted information is input; an encrypted information determiner that determines whether the third encrypted information includes or not predetermined information using a secure program stored in a restricted area of the host unit; and an encrypted information processor that controls the vehicle on the basis of the third encrypted information through the any one module when it is determined that the third encrypted information includes the predetermined information.

In embodiments, the encrypted information relay transmits the third encrypted information to the host unit using HCE (Host Card Emulation) when the third encrypted information is input through the any one module.

In embodiments, the secure program is stored in the restricted area using TEE (Trusted Execution Environment).

Another embodiment provides a method for controlling a vehicle that includes: authenticating a user terminal using any one module of wireless communication modules mounted in a vehicle; and controlling the vehicle in a fit-type in accordance with the position of the any one module when the user terminal is authenticated.

In embodiments, the authenticating uses a module selected from an NFC (Near Field Communication) module, a Bluetooth module, a WiFi module, an RFID module, and a Beacon module, as the any one module.

In embodiments, the authenticating uses a first communication module mounted outside the vehicle and a second communication module mounted inside the vehicle as the wireless communication modules.

In embodiments, the controlling locks or unlocks doors of the vehicle when the first communication module is used as the any one module, and starts or stops the vehicle when the second communication module is used as the any one module.

In embodiments, the authenticating includes: requesting second key information to the user terminal using first key information stored in advance; creating first encrypted information on the basis of the first key information; transmitting the first encrypted information to the user terminal and receiving integrated encrypted information including the first encrypted information and the second encrypted information from the user terminal; and authenticating the user terminal by comparing the first encrypted information and the second encrypted information.

In embodiments, the controlling includes: transmitting third encrypted information to a predetermined host unit when the third encrypted information is input; determining whether the third encrypted information includes or not predetermined information using a secure program stored in a restricted area of the host unit; and controlling the vehicle on the basis of the third encrypted information through the any one module when it is determined that the third encrypted information includes the predetermined information.

In embodiments, the transmitting transmits the third encrypted information to the host unit using HCE (Host Card Emulation) when the third encrypted information is input through the any one module.

The following effects can be obtained through the configuration according to embodiments of the present invention.

First, it is possible to solve a security problem without a problem with the manufacturing cost and the property right when a vehicle and a smart device are connected.

Second, it is possible to ensure convenience for technological implementation because individual technological promotion for integrating other technologies.

Third, it is possible to provide an efficient security solution in order to integrate communication among various devices for a technological trend such as IoT (Internet of Things).

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a conceptual diagram of a vehicle control system according to an embodiment of the present invention.

FIG. 2 is a flowchart illustrating a method of operating a vehicle control system according to an embodiment of the present invention.

FIG. 3 is a conceptual diagram of a vehicle entrance/start secure logic based on a smartphone application according to an embodiment of the present invention.

FIG. 4 is a flowchart illustrating a process of entrance/start control based on a smartphone vehicle entrance/start security application.

FIG. 5 is a diagram of a code for encrypting an AES secure algorithm.

FIG. 6 is a block diagram schematically illustrating an apparatus for controlling a vehicle according to an embodiment of the present invention.

FIG. 7 is a block diagram illustrating an internal configuration of a terminal authenticator of an apparatus for controlling a vehicle.

FIG. 8 is a block diagram illustrating an internal configuration of a vehicle controller of an apparatus for controlling a vehicle.

FIG. 9 is a flowchart schematically illustrating a method for controlling a vehicle according to an embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, embodiments of the present invention will be described in detail with reference to the accompanying drawings. First, in the specification, in adding reference numerals to components throughout the drawings, it should be noted that like reference numerals designate like components even though the components are illustrated in different drawings. In describing the present invention, well-known functions or constructions will not be described in detail since they may unnecessarily obscure the understanding of the present invention. Further, although embodiments of the present invention will be described hereafter, the spirit of the present invention is not limited thereto and may be modified and implemented in various ways by those skilled in the art.

In general, vehicle system security may use a USIM. However, a USIM pertains to a secure memory area having authority for mobile service providers and cooperation with mobile service providers is required to apply a USIM to a vehicle, so there are many problems in commercialization. Further, there is another problem that when a mobile service subscriber wants to change his/her mobile service provider but the mobile service provider has no contract for cooperation, the mobile service subscriber cannot be provided with the desired service.

Embodiments of the present invention relate to a smart device application security technology for an NFC-based smart key system and propose a technology of using a trust zone for NFC door/start control. Further, the present invention proposes implementation of a smart key function using a smart device such as a smartphone, a security technology for NFC and other connectivity technologies, and a secure key storage technology based on a trust zone and the like. Hereinafter, the present disclosure will be described in detail with reference to the accompanying drawings.

FIG. 1 is a conceptual diagram of a vehicle control system according to an embodiment of the present invention.

First, an NFC-applied secure communication technology is described.

NFC-SEC connection for NFC secure communication is classified into an SSE (Shared Secret Service) and an SCH (Secure Channel Service).

The SSE creates a shared secret for NFC-encrypted communication and performs key match and authentication in this process.

The SCH is a communication technique that encrypts and provides data in communication connected through the SSE.

However, a shared key value for executing an encrypting algorithm should be saved between both devices for the above-described secure communication. An SE (Secure Element) technology is required to safely store the shared key value.

Hereinafter, an SE technology for NFC secure communication is described.

The SE technology, which is a secure storage technology, means a technology for safely storing a key value that is the base of an encrypting algorithm for NFC secure communication. The SE technology safely stores and applies data to a secure algorithm using a UICC (Universal IC Card), an SD (Secure Digital card), a baseband processor, and embedded hardware.

However, it has many problems to apply to a vehicle in terms of a property right and costs for each SE. As problems, in terms of property right, the UICC pertains to a mobile service provider, while the baseband processor and the embedded hardware pertain to a mobile phone manufacturer. It is not a problem to apply an SD card in terms of property right, but is problem to apply an SD card in that the cost increases and recent smartphones do not support an SD card slot.

Embodiments of the present invention propose a method of providing a door/start control function of a vehicle through stable NFC secure communication while solving the problem with the SE.

Referring to FIG. 1, a vehicle control system 100 includes a door control module 110, a start control module 120, an SMK ECU (Smart key ECU) 130, a vehicle external NFC module 140, a vehicle internal NFC module 150, and a smartphone/wearable device 160.

The door control module 110 performs a function of unlocking/locking vehicle doors.

The start control module 120 performs a function of starting/stopping an engine of a vehicle.

The vehicle external NFC module 140 is an NFC communication module mounted outside a vehicle.

The vehicle internal NFC module 150 is an NFC communication module mounted inside a vehicle.

The smartphone/wearable device 160 supports NFC communication.

The SMK ECU 130 performs a function of recognizing the smartphone/wearable device 160 learned through NFC secure communication with the vehicle external NFC module 140, and when the smartphone/wearable device 160 is recognized, the SMK ECU 130 performs a function of unlocking/locking vehicle doors by controlling the door control module 110.

Further, the SMK ECU 130 performs a function of recognizing the smartphone/wearable device 160 learned through NFC secure communication with the vehicle internal NFC module 150, and when the smartphone/wearable device 160 is recognized, the SMK ECU 130 performs a function of starting/stopping the engine of a vehicle by controlling the start control module 120.

The vehicle control system 100 described above provides the advantage that it is possible to perform vehicle entrance/start control using the smartphone/wearable device 160 even without a vehicle FOB/RKE/Key.

Next, an operation of vehicle entrance/start control using an NFC module is described.

FIG. 2 is a flowchart illustrating a method of operating a vehicle control system according to an embodiment of the present invention. FIG. 2 illustrates an authentication process using an encrypting algorithm between an NFC module 220 and a smartphone 210 inside and outside a vehicle, respectively. The NFC module 220 is an example of the vehicle external NFC module 140 or the vehicle internal NFC module 150 and the smartphone 210 is an example of the smartphone/wearable device 160.

First, when the smartphone 210 performs NFC communication with the NFC module 220, the NFC module 220 performs a key request to perform an encrypted authentication process using a second key 222 stored in advance for encrypted authentication (S251). The second key 222 may be an open key.

Thereafter, the smartphone 210 receiving the key request sets a first key 212 in a first encrypting algorithm 213 for the encrypted authentication process and generates a random number using a first random number creator 211. Thereafter, the smartphone 210 an encrypted value to the NFC module 220 through the first encrypting algorithm 213 having the first key 212 (S252). The first key 212 may be implemented as an open key having the same value as the second key 222 and the first encrypting algorithm 213 may be implemented as an encrypting algorithm such as DES, 3DES, and AES.

Thereafter, the NFC module 220 generates a self-random number using a second random number creator 221 and transmits an encrypted value to the smartphone 210 through a second encrypting algorithm 223 on the basis of the stored second key 222 (S253). The second encrypting algorithm 223, similar to the first encrypting algorithm 213, may be implemented as an encrypting algorithm such as DES, 3DES, and AES.

Thereafter, the smartphone 210 combines the random numbers created and received through the steps S252 and S253 and encrypts them on the basis of the stored first key 212. Thereafter, the smartphone 210 transmits the encrypted information to the NFC module 220 (S254).

Thereafter, the NFC module decodes the value transmitted from the smartphone 210 and compares the first key 212 and the second key 222 obtained from the value (S255).

When it is determined that the first key 212 and the second key 222 are matched, the NFC module 220 authenticates the smartphone 210, but when it is determined that the first key 212 and the second key 222 are not matched, the NFC module 220 does not authenticate the smartphone 210 (S257).

When the smartphone 210 is authenticated, the SMK ECU 130 locks/unlocks vehicle doors (S258) or starts/stops the vehicle (S259) through NFC communication between the smartphone 210 and the NFC module 220.

The authentication process described above with reference to FIG. 2 may be changed depending on the change of an encrypting algorithm.

Meanwhile, a method of storing a stable key in the smartphone 210 in the authentication process described above is a large risk. Hereafter, a plan to provide vehicle entrance/start control through the NFC module 220 while stably managing the key is described.

FIG. 3 is a conceptual diagram of a vehicle entrance/start secure logic based on a smartphone application according to an embodiment of the present invention.

In the operation of vehicle entrance/start control using NFC described with reference to FIG. 2, the portion of performing KEY, an encrypting algorithm and the like should be safely stored not to be exposed to the outside when being implemented in the smartphone 210. However, a secure storage technology using an SE has many problems to be applied due to differences in property rights for each SE (UICC/SIM pertains to a mobile service provider and HW SE pertains to a mobile phone manufacturer).

Embodiments of the present invention propose a plan that uses HCE (Host Card Emulation) and TEE (Trusted Execution Environment) to solve the problem due to a property right and safely implement a vehicle entrance/start secure logic through a smartphone application.

An HCE mode, which is a technology to be supported by android 4.4 or more for smartphone payment, is a way of solving security problems in cooperation with a cloud authentication server by transmitting important information such as a secure key and financial information to a CPU. The HCE mode is a technology applied to Google wallet or the like.

When important information such as a secure key is stored in a cloud authentication server in the HCE, a storage security ability such as practical use of SE can be ensured.

However, when it is applied to a vehicle control system, there are defects of delay due to every connection to a cloud authentication server and unavailability due to disconnection from a cloud authentication server.

The TEE is a method of prevents a common developer from access to a corresponding portion by opening a safety security OS area in a CPU itself. When a key, a secure algorithm and the like are implemented in the security OS portion, it is possible to solve security problems without using an SE.

Embodiments of the present invention provide a security technology using HCE and TEE to implement a vehicle entrance/start function using the smartphone 210 and the NFC module 220 in a vehicle control system. FIG. 3 is a block diagram of a security technology using a proposed smartphone application.

An NFC reader 310 encrypts and transmits key request information for controlling starting and entrance of a vehicle and information for performing an authentication process to an NFC controller 320.

The NFC controller 320 transmits the encrypted data input from the NFC reader 310 to a host CPU 330 using the HCE mode.

When receiving the encrypted data, the host CPU 330 creates information for performing an authentication process on the basis of the key and the secure algorithm stored in the TEE secure area (Secure OS) 345 of the smartphone platform 340. In this case, the host 330 can create information for the authentication process using a smartphone application 342 in the smartphone OS (Normal Word OS) 341. When the host CPU 330 creates the information for performing the authentication process, the NFC controller 320 transmits the information to the NFC reader 310. Meanwhile, the smartphone application 342 means a TEE-based vehicle entrance/start secure application provided in the smartphone OS 341.

When the information for performing the authentication process is transmitted to the NFC reader 310, the host CPU 330 creates information for door control and information of start control and the like on the basis of a door control request function 343 and a start control request function 344. In this case, the host CPU 330 can create the information for door control and the information for start control and the like using the smartphone application 342. When the information for door control and the information for start control and the like are created by the host CPU 330, the NFC controller 320 transmits the information to the NFC reader 310.

As described above with reference to FIG. 3, embodiments of the present invention can implement a vehicle entrance/start secure technology through an application in a smartphone without a problem with SE property right.

FIG. 4 is a flowchart illustrating a process of entrance/start control based on a smartphone vehicle entrance/start security application.

First, the NFC module 220 performs a key request when communication connection with the smartphone 210 is performed (S405). The step S405 is concept corresponding to the step S251 in FIG. 2.

When a key request for vehicle start/entrance control is input to a first OS 351 of the smartphone platform 340, a second OS 352 sets a key for start/entrance control (S415). The first OS 351 is concept corresponding to the smartphone 341 of FIG. 3 and the second OS 352 is concept corresponding to the TEE secure area 345 of FIG. 3.

Thereafter, the second OS 352 creates a random number (S420) and transmits the random number to the first OS 351 through a secure algorithm (S425).

When receiving the random number, the first OS 351 transmits a random value for performing an authentication process on the basis of the random number from the smartphone 210 to the NFC module 220 (S430 and S435). The step S435 is concept corresponding to the step S252 in FIG. 2.

Thereafter, when the random value for performing an authentication process is transmitted to the smartphone 210 from the NFC module 220 (S440), the first OS 351 transmits the random value to the second OS 352 (S445). The step S440 is concept corresponding to the step S253 in FIG. 2.

Thereafter, when the random value received from the NFC module 220 passes through the secure algorithm (S450), the second OS 352 combines the random value created by itself in the step S420 and the random value received from the NFC module 220 through the step S450 (S455).

Thereafter, the second OS 352 transmits the combined random information to the first OS 351 through the secure algorithm (S460).

Thereafter, the first OS 351 transmits the combined random information from the smartphone 210 to the NFC module 220 (S465 and S470). The step S470 is concept corresponding to the step S254 in FIG. 2.

A vehicle entrance/start control method using an NFC module to which a smartphone vehicle entrance/start secure technology is applied was described above with reference to FIG. 4. According to the method of FIG. 4, when an NFC module mounted in a vehicle requests a key, a smartphone application receives the corresponding request, and a relevant request is sent to the TEE secure area, and an authentication process is performed by perform a random number and an encrypting algorithm using a key stored in the corresponding TEE secure area. When the corresponding authentication process is performed, all of areas except the TEE secure area communicate using encrypted data, so embodiments of the present invention can solve security problems.

Next, a TEE secure function of a secure algorithm is described through an example of an actual code. FIG. 5 illustrates an example of a code for encryption using an AES secure algorithm.

Reference numeral '510' shows that it is possible to obtain a key value by reading values such as ckey and &key. In reference number 510, the AES_set_encrypt_key( ) means a portion where a stored key for encrypting is read.

Reference numeral '520' shows that it is possible to obtain original data before encrypting by reading the value of indata. In reference numeral '520', the AES_ctr128_encrypt( ) in a for loop sentence means a portion where data to be transmitted is encrypted through an AES algorithm.

In the two portions, when a SW hacker performs analysis using reverse engineering, the key is exposed and the data before encrypting is obtained, so a severe problem is generated in security. Using a TEE secure area proposed in embodiments of the present invention is a method of storing a corresponding portion in a trust zone so that a SW developer cannot access, so a secure key and algorithm can be safely stored.

A method for safe design through a smartphone application in implementation of vehicle entrance/start function using NFC was proposed above with reference to FIGS. 1 to 5. According to the proposal described above, it is possible to safely provide a service using a smartphone between vehicles without an influence of the property right for each SE (UICC/SIM: Mobile service provider, Embedded HW: Mobile phone manufacturer).

An embodiment of the present invention was described above with reference to FIGS. 1 to 5. Hereinafter, an embodiment of the present invention that can be inferred from the embodiment is described.

FIG. 6 is a block diagram schematically illustrating an apparatus for controlling a vehicle according to an embodiment of the present invention.

According to FIG. 6, an apparatus 600 for controlling a vehicle includes a terminal authenticator 610, a vehicle controller 620, a power supply 630, and a main controller 640.

The power supply 630 performs a function of supplying power to each component constituting the apparatus 600 for controlling a vehicle. The main controller 640 performs a function of controlling the entire operation of each component constituting the apparatus 600 for controlling a vehicle. Considering the apparatus 600 controlling a vehicle is disposed in a vehicle and can be implemented by an ECU and the like, the power supply 630 and the main controller 640 may not be provided in this embodiment.

The terminal authenticator 610 performs a function of authenticating a user terminal using any one module of wireless communication modules mounted in a vehicle.

The terminal authenticator 610 may use a module selected from an NFC (Near Field Communication) module, a Bluetooth module, a WiFi module, an RFID module, and a Beacon module, as the any one module.

The terminal authenticator 610 may use as the wireless communication modules a first communication module outside the vehicle and a second communication module mounted inside the vehicle.

FIG. 7 is a block diagram illustrating an internal configuration of a terminal authenticator of an apparatus for controlling a vehicle.

According to FIG. 7, the terminal authenticator 610 may include a key information requestor 611, an encrypted information creator 612, an encrypted information transceiver 613, and an encrypted information comparer 614.

The key information requestor 611 performs a function of requesting second key information to a user terminal using first key information stored in advance.

The encrypted information creator 612 performs a function of creating first encrypted information on the basis of the first key information. The encrypted information creator 612 can create first encrypted information using the first key information and a random number.

The encrypted information transceiver 613 performs a function of transmitting the first encrypted information created by the encrypted information creator 612 to a user terminal. Further, the encrypted information transceiver 613 performs a function of receiving integrated encrypted information including the first encrypted information and the second encrypted information from the user terminal. The second encrypted information is created on the basis of the second key information.

The encrypted information comparer 614 performs a function of authenticating the user terminal by comparing the first encrypted information and the second encrypted information obtained by decoding the integrated encrypted information. In this case, the terminal authenticator 610 may further include a decoder that decodes the integrated encrypted information.

The encrypted information comparer 614 authenticates the user terminal when the first encrypted information and the second encrypted information are matched, and does not authenticate the user terminal when the first encrypted information and the second encrypted information are not matched.

This will be described with reference to FIG. 6 again.

The vehicle controller 620 performs a function of controlling a vehicle in a fit-type in accordance with the position of any one module when the user terminal is authenticated by the terminal authenticator 610.

The vehicle controller 620 may perform a function of locking or unlocking doors of the vehicle when the first communication module is used as any one module. Further, the vehicle controller 620 may perform a function of starting or stopping the vehicle when the second communication module is used as any one module.

FIG. 8 is a block diagram illustrating an internal configuration of a vehicle controller of an apparatus for controlling a vehicle.

According to FIG. 8, the vehicle controller 620 may include an encrypted information relay 621, an encrypted information determiner 622, and an encrypted information processor 623.

The encrypted information relay 621 performs a function of transmitting third encrypted information to a predetermined host unit when the third encrypted information is input. The encrypted information relay 621 can transmit the third encrypted information to the host unit using HCE (Host Card Emulation) when the third encrypted information is input through any one module.

The encrypted information determiner 622 performs a function of determining whether the third encrypted information includes or not predetermined information using a secure program stored in a restricted area of the host unit. The secure program is stored in the restricted area using TEE (Trusted Execution Environment). For example, the secure program may be stored in a safety security OS area of the host unit itself (for example, Host CPU) as the restricted area.

The encrypted information processor 623 performs a function of controlling the vehicle on the basis of the third encrypted information through any one module when it is determined that the third encrypted information includes the predetermined information by the encrypted information determiner 622.

Next, an operation method of the apparatus of controlling a vehicle is described. FIG. 9 is a flowchart schematically illustrating a method for controlling a vehicle according to an embodiment of the present invention.

First, the terminal authenticator 610 authenticates a user terminal using any one module of wireless communication modules mounted in a vehicle (S710).

When the user terminal is authenticated, the vehicle controller 620 controls the vehicle in a fit-type in accordance with the position of any one module (S720).

Although all of the components of the embodiments of the present invention described above are combined in one unit or operated as one unit, the present invention is not necessarily limited to the embodiments. In embodiments, all of the components can be selectively combined in one or more units and operated, as long as they are included in the scope of the present invention. Further, all of the components may be implemented by one independent hardware, respectively, but some or all of the components may be selectively combined and implemented by computer programs having a program module that performs some or all of functions combined by one or more pieces of hardware. Further, computer programs can be stored on computer readable media that a computer can read such as an USB memory, a CD disk, and a flash memory, and read and executed by a computer, thereby implementing the embodiments of the present invention. A magnetic recording medium, an optical recording medium, and a carrier wave medium may be included in the recording media of computer programs.

Further, unless defined otherwise in the detailed description, all the terms used in the specification including technical and scientific terms have the same meaning as those that are understood by those skilled in the art. The terms generally used such as those defined in dictionaries should be construed as being the same as the meanings in the context of the related art and should not be construed as being ideal or excessively formal meanings, unless defined in the present disclosure.

The above description is an example that explains the spirit of the present invention and may be changed, modified, and replaced in various ways without departing from the basic features of the present invention by those skilled in the art. Accordingly, the embodiment described herein and the accompanying drawings are provided not to limit, but to explain the spirit of the present invention and the spirit and the scope of the present invention are not limited by the embodiments and the accompanying drawings. The protective range of the present invention should be construed on the basis of claims and all the technical spirits in the equivalent range should be construed as being included in the scope of the right of the present invention.

As described above, the embodiments have been described and illustrated in the drawings and the specification. The embodiments were chosen and described in order to explain certain principles of the invention and their practical application, to thereby enable others skilled in the art to make and utilize various embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method for controlling a vehicle, comprising:
authenticating a user terminal via NFC communication of an NFC module of the vehicle with the user terminal; and
controlling the vehicle according to authentication of the user terminal,
wherein authenticating the user terminal comprises:
receiving, from the user terminal, a first random number generated using a first encrypting algorithm and a first key stored in the user terminal;
subsequently generating a second random number at the NFC module using a second encrypting algorithm and a second key stored in the NFC module;
subsequently transmitting the second random number from the NFC module to the user terminal;
receiving, from the user terminal, an encrypted data generated by combining and encrypting the first random number and the second random number;
subsequently decoding the encrypted data at the NFC module to provide the first key and the second key; and
authenticating the user terminal when the first key and the second key from the encrypted data match each other,
wherein the first random number is generated in Trusted Execution Environment (TEE) of the user terminal that stores the first encrypting algorithm and the first key.

2. The method of claim 1, wherein the Trusted Execution Environment (TEE) of the user terminal stores the first encrypting algorithm and the first key.

3. The method of claim 1, wherein the encrypted data generated by combining and encrypting the first random number and the second random number is generated in the Trusted Execution Environment (TEE) of the user terminal.

4. The method of claim 1, wherein when the user terminal is authenticated via an external NFC module, the controller locks a door of the vehicle, whereas when the user terminal is authenticated via an internal NFC module the controller starts the vehicle.

* * * * *